(12) United States Patent
Anantha (10) Patent No.: US 7,720,935 B2
(45) Date of Patent: May 18, 2010

(54) STORAGE AGGREGATOR (75) Inventor: Anoop Anantha, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1114 days.

(21) Appl. No.: 11/092,154

(22) Filed: Mar. 29, 2005

(65) Prior Publication Data
US 2006/0224739 A1 Oct. 5, 2006

(51) Int. Cl.
G06F 15/16 (2006.01)
(52) U.S. Cl. ...................................... 709/219
(58) Field of Classification Search .................. None
See application file for complete search history.

(56) References Cited

U.S. PATENT DOCUMENTS

| | | | |
|---|---|---|---|
| 6,795,830 B1 * | 9/2004 | Banerjee et al. ............. 707/200 |
| 6,826,613 B1 * | 11/2004 | Wang et al. .................. 709/227 |
| 7,277,924 B1 * | 10/2007 | Wichmann et al. ........... 709/217 |
| 2002/0103907 A1 * | 8/2002 | Petersen ...................... 709/226 |
| 2003/0050815 A1 * | 3/2003 | Seigel et al. .................... 705/7 |
| 2003/0060157 A1 * | 3/2003 | Henrick ...................... 455/3.04 |
| 2003/0145045 A1 * | 7/2003 | Pellegrino et al. ........... 709/203 |
| 2003/0172146 A1 * | 9/2003 | Collins ........................ 709/223 |
| 2004/0230663 A1 * | 11/2004 | Ackerman ................... 709/207 |

* cited by examiner

Primary Examiner—Vivek Srivastava
Assistant Examiner—Minh-Chau Nguyen
(74) Attorney, Agent, or Firm—Lee & Hayes, PLLC (57) ABSTRACT A storage aggregator is described. In an implementation, a method includes executing a module to determine whether sufficient storage is available to the module to store a particular content item and access a content storage provider over a network to open a client account to obtain additional storage when sufficient storage is not available.

18 Claims, 5 Drawing Sheets

STORAGE AGGREGATOR

TECHNICAL FIELD

The present invention generally relates to storage and more particularly relates to a storage aggregator.

BACKGROUND

Users today have access to and utilize a wide range of content that is electronically stored. For example, a user may access digital photos, songs, documents, applications, and so on. As the prevalence of this content increases, the amount of storage needed to store this content is also ever increasing. For example, the user may wish to store thousands of songs and pictures for later retrieval. The amount of storage required to save these thousands of songs and pictures may be quite significant, even to the point that the user does not have sufficient storage available on any one particular device to store the content. For example, the user may utilize a portable digital song player that has sufficient storage for a library having thousands of songs. The user may also wish to store a backup version of this library to a laptop computer. However, the laptop computer may not have sufficient available storage to store these songs with the other data already stored on the computer.

Additionally, the user may utilize a wide variety of computing devices during the course of a typical day. Continuing with the previous example, for instance, the user may listen to the portable digital song player while commuting to work, access a personal computer (PC) while at work, read email while at lunch using a wireless personal digital assistant (PDA), access the Internet while at home using the laptop, and so on. The content stored by the user, however, may be stored on different ones of these computing devices and therefore limit access of the user to the content to particular computing devices which actually stores the content. Additionally, as previously described, even if the user is willing to duplicate the content on each computing device, such duplication may not be possible. For example, the user may not be able to store the library of songs using the laptop computer due to insufficient storage of the laptop.

Therefore, there is a continuing need for improved storage techniques for content.

SUMMARY

A storage aggregator is described. In an implementation, a method includes executing a module to determine whether sufficient storage is available to the module to store a particular content item and access a content storage provider over a network to open a client account to obtain additional storage when sufficient storage is not available.

In another implementation, a method includes receiving a content item from a requestor for storage and dividing the content item into a plurality of portions. At least one of the portions is output for storage in a client account and another one of the portions is output for storage in another client account. Each of the client accounts is accessible over a network.

In a further implementation, one or more computer readable media include computer executable instructions that configure a computing device to aggregate storage available from a plurality of content storage providers over a network into a single content storage representation. The computer executable instructions further configure the computing device to process content received via the single content storage representation to be compatible for storage on at least one of the content storage providers that otherwise would not be compatible for storage.

BRIEF DESCRIPTION OF THE DRAWINGS

The same reference numbers are utilized in instances in the discussion to reference like structures and components.

DETAILED DESCRIPTION

Overview

A storage aggregator is described. Users require ever greater amounts of electronic storage for content, such as songs, photos, documents, movies, and so on. Although online storage is available to the user, it is greatly fragmented and therefore difficult for the user to access. Each service which provides online storage typically provides a small amount of storage for a specific application, such as email, photo storage, web logs (i.e., "blogs"), and so on.

In an implementation, a storage aggregator is described which abstracts the storage of various services and enables users to use these various services as a single repository for whatever type of content is desired for storage. For instance, the storage aggregator may connect to different services and have these services act as a "backend" for the storage aggregator. The storage aggregator may provide and present a unified network drive interface to a user. The user may then drag and drop documents, photos, music files, and so on into this network drive interface and have the storage aggregator seamlessly store the content on the backend service. Thus, the storage aggregator abstracts the storage concepts (e.g., uuencode) away from the user, may act as a network drive that is portable across the Internet, and may be accessed by a variety of computing devices. Additionally, the storage aggregator may be accessed directly by applications to store content such that the applications are not aware of how and where the content is stored by the storage aggregator. In the following discussion, an exemplary environment is first described which is operable to employ the storage aggregator. Exemplary procedures are then described which may be implemented in the exemplary environment, as well as in other environments.

Exemplary Environment

Figure 1:
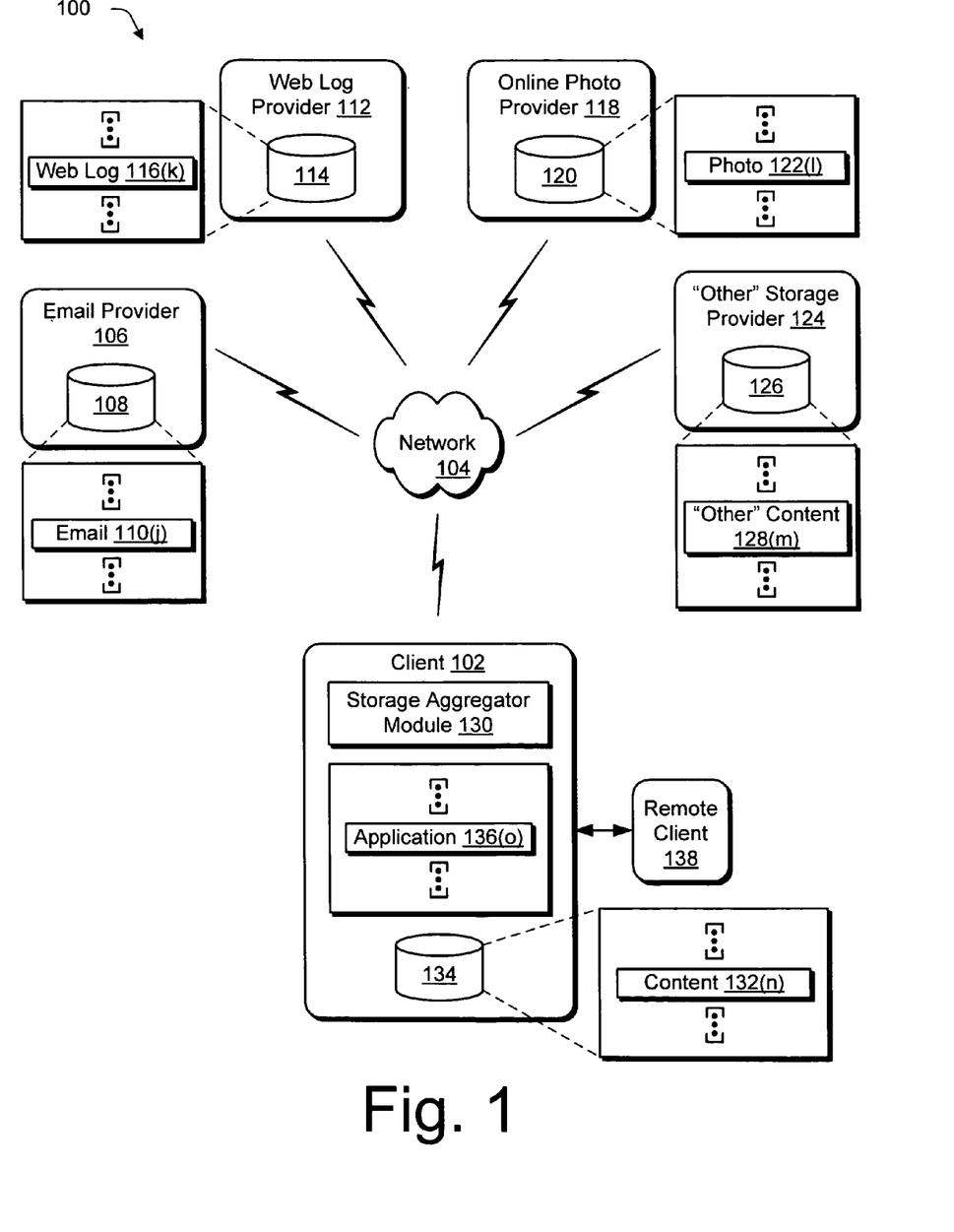
FIG. 1 is an illustration of an environment in an exemplary implementation that is operable to employ techniques for storage aggregation.

FIG. 1 is an illustration of an environment 100 in an exemplary implementation that is operable to employ techniques for storage aggregation. The illustrated environment 100 includes a client 102 that is communicatively coupled to a network 104 to access a plurality of content storage providers.

The client 102 may be configured in a variety of ways for accessing the network 104. For example, the client 102 may be configured as a computing device, such as a desktop computer, a mobile station, an entertainment appliance, a set-top box communicatively coupled to a display device, a wireless phone, a game console, and so forth. Thus, the client 102 may range from full resource devices with substantial memory and processor resources (e.g., personal computers, game consoles) to low-resource devices with limited memory and/or processing resources (e.g., traditional set-top boxes, hand-held game consoles). The client 102 may also relate to a person and/or entity that operate the client. In other words, the client 102 may also describe a logical client that includes users, software, and/or devices.

Although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks.

Content storage providers may be configured in a variety of ways. For example, a content storage provider may be configured an email provider 106. The email provider 106 is illustrated as having storage 108 for a plurality of email 110(j), where "j" can be any integer from one to "J". For example, the email provider 106 may store email 110(j) which corresponds to the client 102 for later retrieval by the client 102 over the network 104. In another example, a content storage provider is configured as a web log provider 112. The web log provider 112 includes storage 114 for a plurality of web logs 116(k), where "k" can be any integer from one to "K". A web log 116(k) is typically configured as a journal that is available over the network 104. The web log 116(k) may be configured to accept textual and non-textual inputs (e.g., pictures) for posting such that a plurality of other clients may access and comment on the web log 116(k). For instance, clients posting to the web log 116(k) may have their respective entries arranged in chronological order for viewing by other clients. Thus, the web log provider 112 provides storage 114 to make the web log 116(k) which includes these postings available to the other clients.

A content storage provider may also be configured as an online photo provider 118 which includes storage 120 for a plurality of photos 122(l), where "l" can be any integer from one to "L". For instance, the online photo provider 118 may be provided by a photo developer that exposes photos processed by the developer to be available electronically via the network 104. In another instance, the online photo provider may be configured as an online "photo shoebox", in which, the client 102 may store photos. For example, the client 102 may store photo 122(l) in the storage 120 to make the photo 122(l) available to other clients over the network 104. In another example, the photo 122(l) is only available to the client 102. A variety of other examples are also contemplated.

A content storage provider may also be configured in a variety of other 124 ways to provide storage 126 for a variety of other content 128(m), where "m" can be any integer from one to "M". For example, the other content 128(m) may be configured as a plurality of songs that are stored in a "music locker" in storage 126 of the other storage provider 124. The client 102 may therefore store and retrieve songs over the network 104 from the storage 126. A variety of other content types and storage providers are also contemplated without departing from the spirit and scope thereof, such as any other machine instructions such as program files, applications, and so on.

As shown in these above examples, the client 102 may have access to a plurality of content storage providers over the network 104 that are specifically configured to store a variety of different content types. To manage this access, the client 102 includes a storage aggregator module 130, which hereinafter may be referred to as a "storage aggregator module" or "storage aggregator". The storage aggregator module 130 is executable to provide a unified storage interface that utilizes the plurality of content storage providers for the actual content storage. In other words, the plurality of content storage providers (e.g., email provider 106, web log provider 112, online photo provider, "other" storage provider 124) act as a "backend" for storage of content by the storage aggregator module 130.

The storage aggregator module 130, for example, may provide a representation in a user interface of a network drive that is available to the client 102. The client 102 may "drag and drop" one or more of a plurality of content items 132(n) (where "n" can be any integer from one to "N") which are available in storage 134 that is local on the client 102 to this representation for storage on one or more of the plurality of content storage providers. Further, the storage aggregator module 130 may "abstract away" this network storage such that details of the storage performed by the storage aggregator module 130 are "hidden" from view. For instance, where the content 132(n) is stored (e.g., a particular content storage provider), a format that is used to store the content 132(n), encryption, compression, and so on may be handled by the storage aggregator module 130. Thus, the storage aggregator module 130 may be utilized by a plurality of applications 136(o), where "o" can be any integer from one to "O", without specifically configuring the applications 136(o). For instance, the functionality of the storage aggregator module 130 may be hidden from the application 136(o) behind a representation of a network drive. Therefore, the application 136(o) believes that the content provided by the application 136(o) is merely stored in a network drive, and is not aware of the particulars as to how this storage is achieved. Further discussion of processing performed by the storage aggregator module 130 for storage of content on one or more of the plurality of content storage providers may be found in relation to FIG. 2.

Although the storage aggregator module 130 is illustrated as being executed on a client 102 and accessed directly through the client 102 (e.g., through execution of application 136(o) on the client 102), the storage aggregator module 130 may also provide aggregated storage to a remote client 138. For example, client 102 may be configured as a web site that provides the functionality of the storage aggregator module 130 to the remote client 138, such as to store songs from the remote client 138 on the plurality of content storage providers. A variety of other instances are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the storage aggregation techniques described below are platform-independent, meaning that the techniques may be implemented on a variety of commercial computing platforms having a variety of processors.

Figure 2:
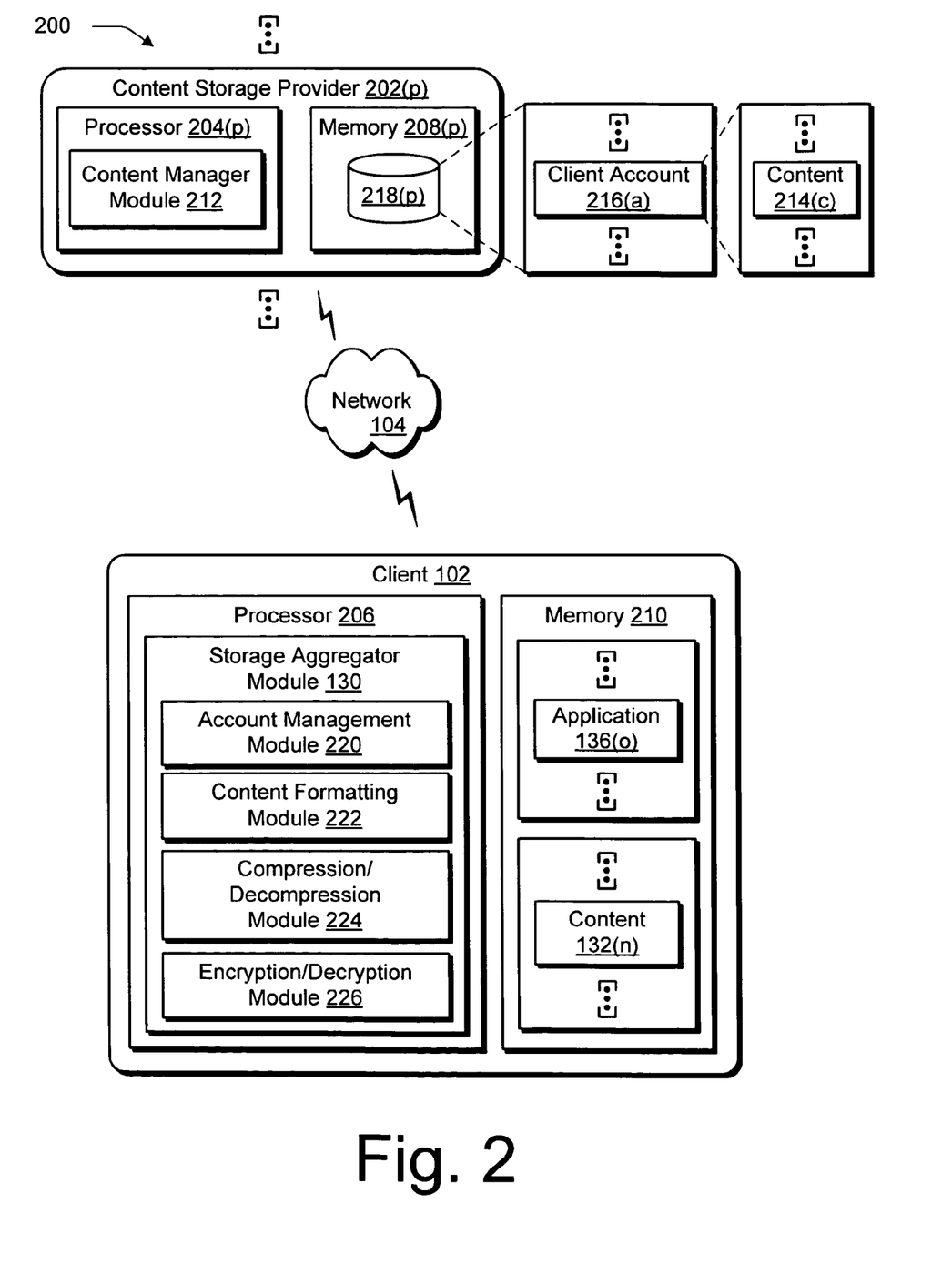
FIG. 2 is an illustration of a system in an exemplary implementation showing a plurality of content storage providers and a client of FIG. 1 in greater detail.

FIG. 2 is an illustration of a system 200 in an exemplary implementation showing a plurality of content storage providers and the client 102 of FIG. 1 in greater detail. The plurality of content storage providers 202(p) (where "p" can be any integer from one to "P") may or may not represent one or more of the content storage providers of FIG. 1, e.g., email provider 106, web log provider 112, online photo provider 118, "other" storage provider 124, and so on. The content storage providers 202(p) and the client 102 are illustrated in the system 200 of FIG. 2 as being implemented by a plurality of computing devices. For instance, the content storage providers 202(p) and the client 102 are illustrated as having a respective processor 204(p), 206 and a respective memory 208(p), 210.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(p), 210 is shown, respectively, for content storage provider 202(p) and the client 102, a wide variety of types and combinations of memory may be employed, such as random access memory (RAM), hard disk memory, removable medium memory, and so forth.

The content storage provider 202(p) is illustrated as executing a content manager module 212 on the processor 204(p), which is also storable in memory 208(p). The content manager module 212 is executable to manage content 214(c) (where "c" can be any integer from one to "C") available via the content storage provider 202(p). For example, the content manager module may arrange content 214(c) into a plurality of client accounts 216(a) (where "a" can be any integer from one to "A") which are available in storage 218(p). Each client account 216(a), for instance, may have a corresponding client name and password for accessing the client account 216(a). The content manager module 212 may set these client names and passwords and also manage an allowable size of the client account 216(a).

The content storage provider 202(p), for example, may be configured as an email provider which provides the plurality of client accounts 216(a) for storage of email, e.g., the content 214(c). Each client account 216(a) may be given a maximum amount of storage, such as 250 megabytes, one gigabyte, and so on. Additional storage space may be made available for a fee. Thus, the content manager module 212 may prevent an inordinate amount of the overall storage 218(p) from being utilized by one or more of the client accounts 216(a). A variety of other content management techniques may be employed by the content manager module 212 without departing from the spirit and scope thereof.

The storage aggregator module 130 is illustrated as being executed on the processor 206 and is storable in memory 210 of the client 102. The storage aggregator module 130 is executable to provide a variety of functionality for storage of content in the content storage provider 202(p). For example, the storage aggregator module 130 may employ an account management module 220. The account management module 220 is representative of the functionality of the storage aggregator module that is responsible for interaction with the client accounts 216(a) of the content storage provider 202(p). For instance, the account management module 220 may be executable to obtain a client account 216(a) from the content storage provider 202(p), such as by providing a client name and password derived by the account management module 220 automatically and without user input. The account management module 220 may also manage which content is stored in which of a plurality of client accounts 216(a), amount of storage available in each client account 216(a), and so on.

The account management module 220 may also support a plurality of pluggable modules that are particular to specific content storage providers 202(p). For example, the content storage provider 202(p) may include a pluggable module which "understands" the particular login process of an email provider. A variety of other instances are also contemplated.

The storage aggregator module 130 is also illustrated as including a content formatting module 222. The content formatting module 222 is representative of the functionality of the storage aggregator module 130 to format content received by the storage aggregator module 130 for storage by the content storage provider 202(p). For example, the content storage provider 202(p) may be configured to store photos in the client account 216(a). The storage aggregator module 130 may receive a song and reformat the song into a graphics format (e.g., JPEG, bitmap, and so on) for storage by the content storage provider 202(p). It should be noted that such translation need not necessarily be representative, by itself, of the original format of the content received by the storage aggregator module 130. In this example, for instance, a user viewing the photo generated by the content formatting module 222 may not "see" the song as received, but rather see a picture that may or may not make sense to the user. The storage aggregator module 130, however, understands how such translation was achieved and therefore may recover the song from the photo as saved by the content storage provider 202(p). Thus, in this way, the content formatting module 222 may leverage content storage providers 202(p) which support particular content types (e.g., music, songs, and so on) to store "other" types of content.

The content formatting module 222 may also support "pluggable" module functionality for particular content formats. For example, the content formatting module 222 may include a pluggable module for translating content into a particular song format. Therefore, as new formats are encountered, a pluggable module may be written for each format such that extensive rewriting of the storage aggregator module 130 is not needed. Further discussion of content formatting by the storage aggregator module 130 may be found in relation to FIG. 4.

The storage aggregator module 130 is also illustrated as including a compression/decompression module 224. The compression/decompression module 224 is representative of functionality that is available to the storage aggregator module 130 to compress and decompress content for storage on the content storage provider 202(p). For example, the compression/decompression module 224 may be executable to employ one or more algorithms for compressing content for storage on the content storage provider 202(p). When compressed content is requested, the compression/decompression module 224 may be executed to decompress the compressed content back into its original form.

The storage aggregation module 130 may also support encryption and decryption of content 132(n), which is represented in FIG. 2 by an encryption/decryption module 226. For example, the encryption/decryption module 226 may encrypt content 132(n) for storage on the content storage provider 202(p) such that the content 132(n) is not readable by the content storage provider 202(p). It should be noted that the content formatting module 222 may also provide a level of encryption. For instance, a song may be reformatted by the content formatting module 222 into a graphics format and stored in storage 218(p) on the content storage provider 202(p). The content storage provider 202(p), however, when viewing the graphics file is generally unable to determine the original format and contents of the content utilized to generate the graphics file. For example, the content storage provider 202(p) may view what appears to be a random collection of pixels but which is actually representative of a song. Further discussion of execution of the encryption/decryption module 226 may be found in relation to FIG. 4.

Although examples of exemplary sub-modules were discussed in relation to the storage aggregator module 130 of FIG. 2, this module may support a wide range of additional functionality. For example, the storage aggregator module 130 may be executable to provide redundancy such that should any one of the content storage providers 202(p) become unavailable, the content may be retrieved from another content storage provider 202(p). Additionally, although content as utilized by an application has been described, the content may be configured in a wide variety of ways. For example, the content may be configured as a portion of an application or any other data that is electronically storable.

Exemplary Procedures

The following discussion describes storage aggregation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
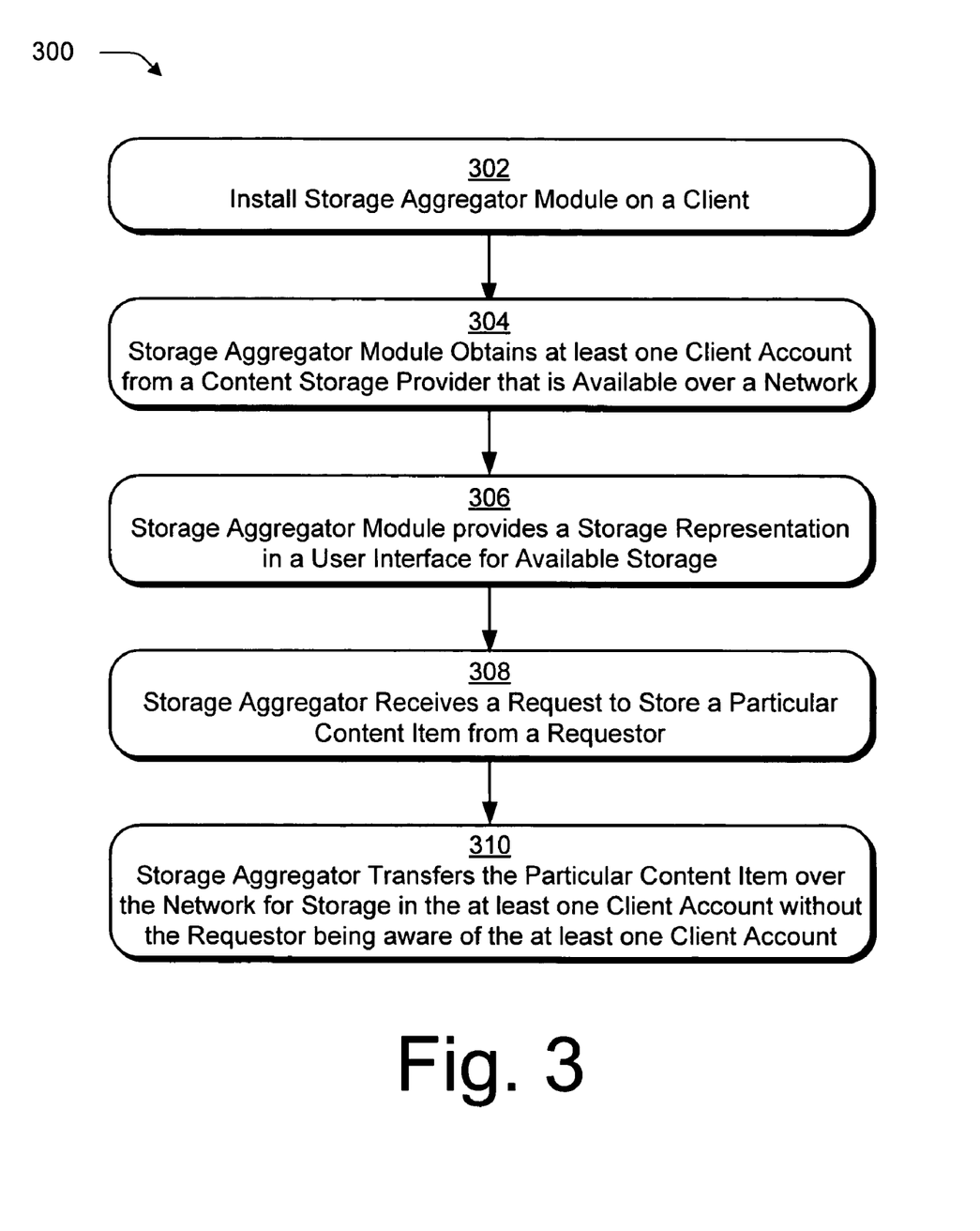
FIG. 3 is a flow diagram depicting a procedure in an exemplary implementation in which a storage aggregator abstracts storage of content on a plurality of content storage providers which are available over a network.

FIG. 3 is a flow diagram depicting a procedure 300 in an exemplary implementation in which a storage aggregator abstracts storage of content on a plurality of content storage providers which are available over a network. The storage aggregator is installed on a client (block 302). For example, the client 102 may receive a computer readable medium having the storage aggregator module. In another example, the storage aggregator module 130 is communicated over the network 104 and installed on the client 102.

The storage aggregator module then obtains at least one client account from a content storage provider that is available over a network (block 304). For example, the storage aggregator module may query a list of list of content storage providers over a network to select a particular content storage provider. In another example, the storage aggregator module may include such a list and update that list over the network 104 at periodic intervals. In a further implementation, the storage aggregator module may utilize a plurality of considerations when selecting a content storage provider, such as amount of time required to access the provider, amount of storage space available from the provider, cost of the storage space, processing time to place content in a condition which is acceptable by the provider, and so on.

Once a content storage provider is selected, the storage aggregator module 130 executes the account management module 220 to obtain a client account. For example, the account management module 220 may interact with the content manager module 212 and provide a client name and password to "open" a client account 216(a). For instance, the account management module 220 may generate a random client name and password and provide these to the content manager module 212 to open the client account 216(a). If this is denied by the content manager module 212, another client account name and password may be randomly generated. In another instance, the account management module 220 may select one of a plurality of client account names and passwords from a list. A variety of other instances are also contemplated.

The storage aggregator module provides a storage representation in a user interface for available storage (block 306). The storage representation may be provided in a variety of ways. For example, the storage representation may be configured as a representation of a storage that is available via the client 102, such as a network hard drive, hard drive that is local to the client 102, and so on. Therefore, the applications 136(o) may store and retrieve content via the representation without being modified. A user of the client 102 may also utilize this representation to manually store and retrieve content. Thus, neither the user nor the applications 136(o) need be aware of the specific functionality employed by the storage aggregator to store and retrieve content.

For example the storage aggregator may receive a request to store a particular content item from a requestor, such as the application 136(o) or user of the client 102 (block 308). The storage aggregator may transfer the particular content item over the network for storage in the at least one client account without the requestor being aware of the at least one client account (block 310). For instance, the storage aggregator module 130 may "logon" to the client account 216(a) and store content 132(n) as content 214(c) without notifying the application 136(o) or the user of where the content 214(c) is located. Rather, the user and/or the application 136(o) may believe that the content 132(n) was stored locally on the client 102 and/or remotely at a network drive. In another implementation, the user and/or the application 136(o) may be made aware of the location of the content 214(c), such as a network address of the content storage provider 202(p), description of the content 214(c) stored on the content storage provider 202(p), and so on.

Figure 4:
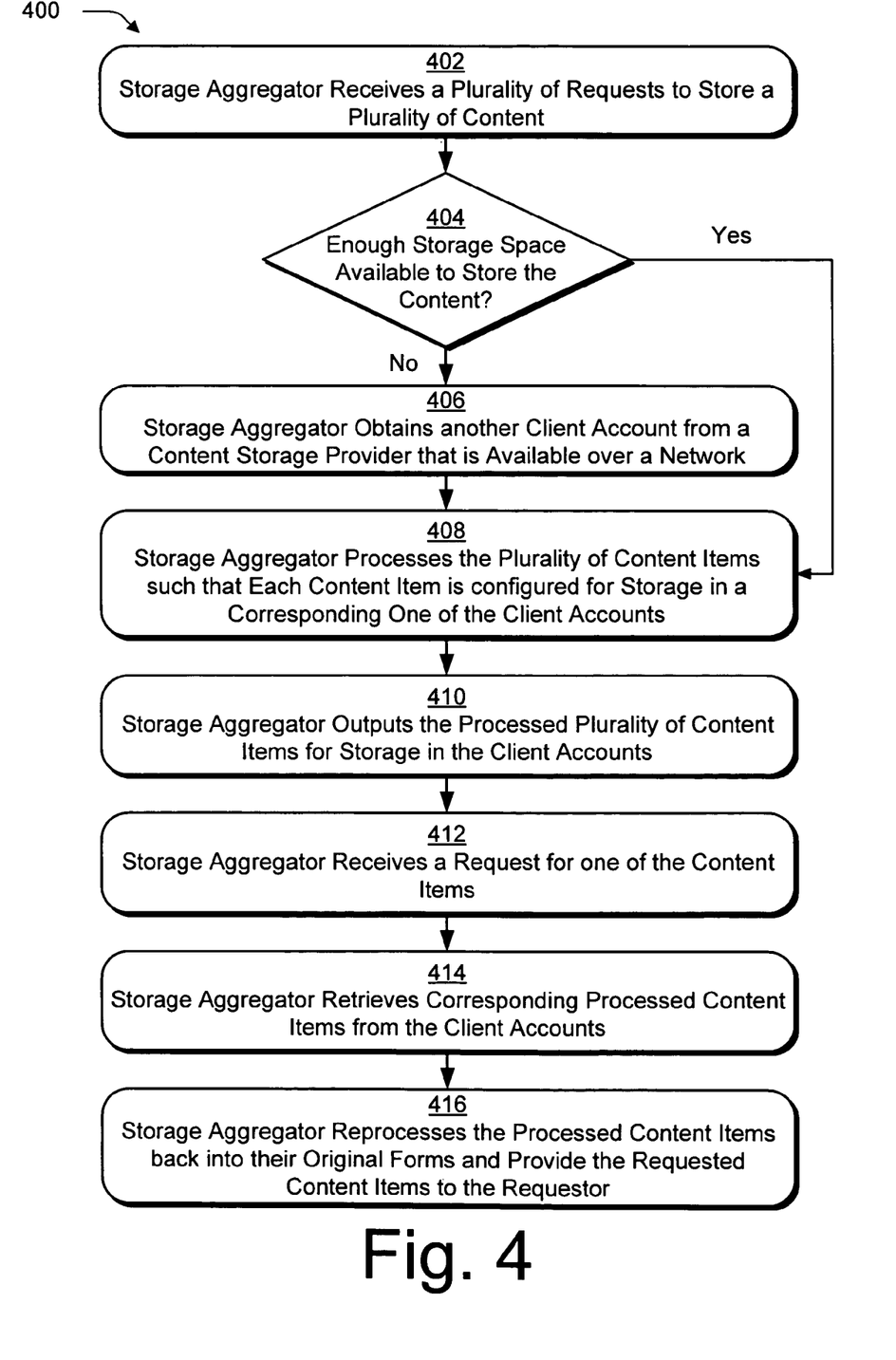
FIG. 4 is a flow diagram depicting a procedure in an exemplary implementation in which a storage aggregator module automatically obtains an additional client account when additional content storage space is desired.

FIG. 4 is a flow diagram depicting a procedure 400 in an exemplary implementation in which a storage aggregator module automatically obtains additional client accounts when additional content storage space is desired. The storage aggregator receives a plurality of requests to store a plurality of content (block 402). For example, the storage aggregator may receive a content item that has been "dragged and dropped" to a storage representation provided by the storage aggregator, such as a representation of a storage device.

The storage aggregator makes a determination as to whether that is enough storage space available to store the content (decision block 404). For example, the account management module 220 may be executed to determine the total amount of storage space which is available to the client 102 in a plurality of client accounts and the amount of that space which is currently being utilized to store content.

If there is not enough storage space available ("no" from decision block 404), the storage aggregator obtains another client account from a content storage provide that is available over a network (block 406). For example, the account management module 220 may receive an indication of how much storage is needed to store the content from the plurality of requests and open client accounts 216(a) until sufficient storage is obtained.

When there is sufficient storage ("yes" from decision block 404 or after a sufficient number of client accounts have been opened from block 406), the storage aggregator processes the plurality of content items for storage in the client accounts (block 408). For example, this processing may involve utilizing a variety of techniques to make the content suitable for storage in a respective client account. In a first instance, the content may be reformatted from its original type into a type that is supported by the content storage provider, such as from a photo to a music file. In another instance, the content may be portioned for storage to "fit" in the client account. For example, the content may consume an amount of storage that is greater than that which is available in the client account. Accordingly, the storage aggregator module may divide the content into a plurality of portions for storage in a plurality of client accounts, further discussion of which may be found in relation to FIG. 5.

In a further instance, the content may be encrypted and compressed to prevent the content storage provider 202(p) from reading the actual data which makes up the content. In this instance, the storage aggregator may act as a "secure online lockbox" to store the content. A variety of other instances are also contemplated.

After the content has been stored (block 410), the storage aggregator receives a request for one of the content items (block 412). For example, an application may request a particular content item that it believes is stored in the storage representation provided by the storage aggregator. In response to the request, the storage aggregator module retrieves corresponding processed content items from the client accounts (block 414). For example, the account management module 220 may track which client accounts 216(a) on which content storage providers 202(p) include content and obtain the requested content from the corresponding client accounts.

The storage aggregator then reprocesses the processed content items back into their original forms and provide the request content items to the requestor (block 416). For example, the storage aggregator module may decrypt, decompress and reformat the content back into the original form as received by the storage aggregator. Thus, the requestor (e.g., an application and/or a user) may receive content back in a form as originally submitted and might not even be aware that such processing was performed.

Figure 5:
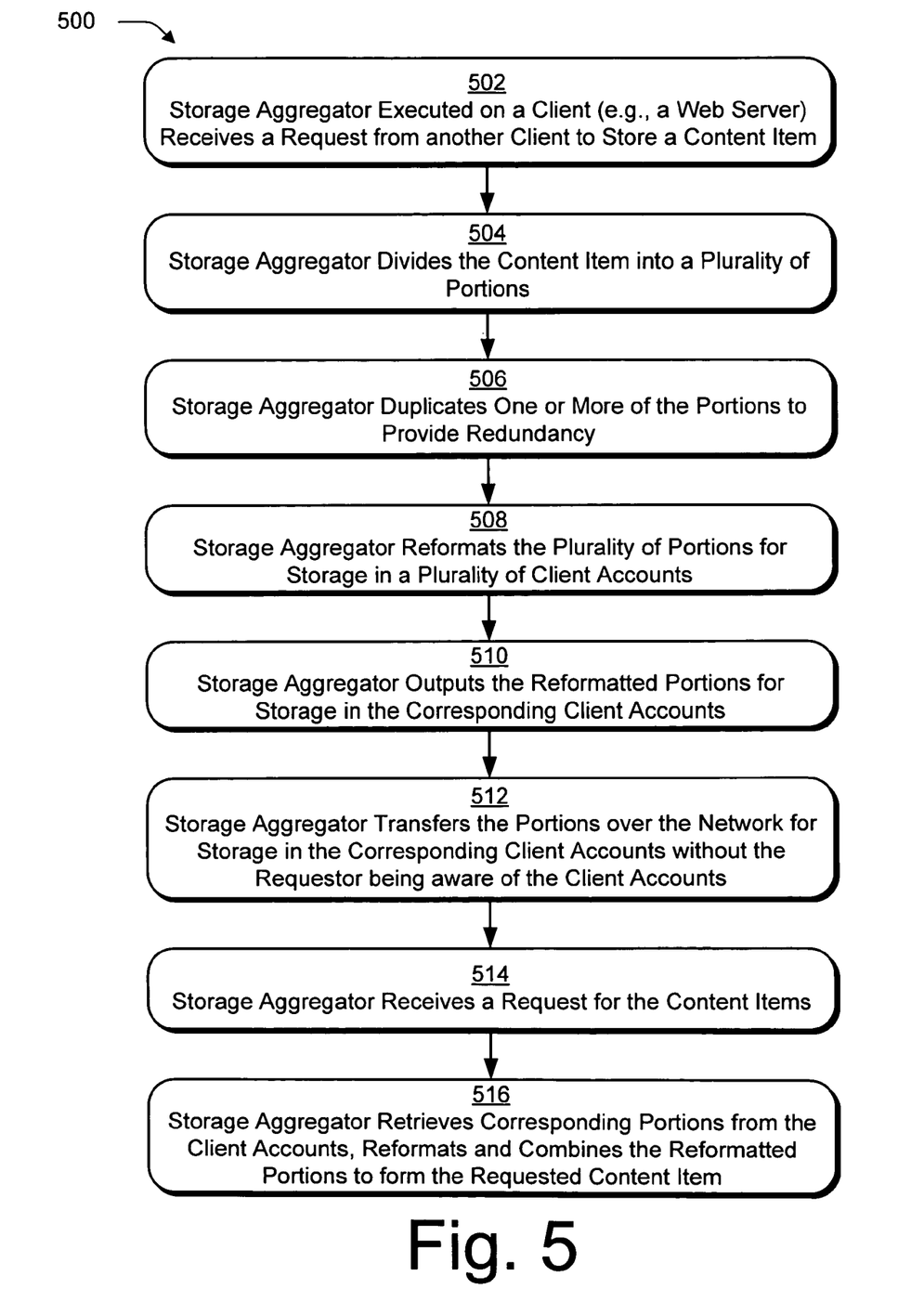
FIG. 5 is a flow diagram depicting a procedure in an exemplary implementation in which a storage aggregator divides a content item into a plurality of portions for storage in a plurality of client accounts.

FIG. 5 is a flow diagram depicting a procedure 500 in an exemplary implementation in which a storage aggregator divides a content item into a plurality of portions for storage in a plurality of client accounts. A storage aggregator that is executed on a client (e.g., a web server) receives a request from another client to store a content item (block 502). For example, the storage aggregator may be executed on a music storage site to store song files received from other clients on the plurality of content storage providers. In another example, the storage aggregator may be provided by a storage aggregation service which owns each of the other content storage providers, such as by providing email storage and so on.

The storage aggregator then divides the content item into a plurality of portions (block 504). For example, each portion may be configured to have a relatively uniform size that is configured for efficient communication across the network 104 for storage by the content storage provider 202(p).

The storage aggregator then duplicates one or more of the portions to provide redundancy (block 506). For example, the storage aggregator may duplicate each portion for storage by different content storage providers such that should a content storage provider become unavailable, sufficient portions are available to reconstruct the content item from the portions obtained from other available content storage providers. A variety of other techniques may be utilized for duplication and storage, such as through use of parity bits and so on.

The storage aggregator reformats the plurality of portions for storage in a plurality of client accounts (block 508). As previously described, for instance, each content storage provider may support a specific content format, such as music (e.g., MP3), graphics (e.g., JPEG, bitmap), and so on. Therefore, the storage aggregator executes the content formatting module 222 to reformat the portions, if necessary, for storage in the respective content storage provider. For example, the content formatting module 222 may format a first portion for storage in a first content provider and a second portion for storage in another content provider. Further these formats may be incompatible, one with another. For instance, the format supported by the first content provider may be incompatible with the format supported by the second content provider, and vice versa.

The storage aggregator outputs the reformatted portions for storage in the corresponding client accounts (block 510). Continuing with the previous example, the storage aggregator may output the first portion for communication to the first content provider and the second portion for communication to the second content provider. Further, the storage aggregator may transfer the portions over the network for storage in the corresponding client accounts without the requester being aware of the client accounts (block 512). Thus, the storage aggregator may "abstract away" the storage of the portions without requiring that the application be aware of the dividing (e.g., block 504), duplicating (e.g., block 506), reformatting (e.g., block 508), outputting (e.g., block 510), and so on.

The storage aggregator then receives a request for the content item (block 514). For example, an application may attempt to access a representation of a storage device provided by the storage aggregator module. In response to the request, the storage aggregator retrieves the corresponding portion from the client accounts, reformats the portion, and combines the reformatted portion to form the requested content item (block 516). Thus, the storage aggregator may "reconstitute" the portions to provide the content item as originally received by the storage aggregator.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising executing, via a processor, a storage aggregator module to perform operations comprising:
   presenting an interface to a user to request to store a particular content item without a user knowing details of how and where the particular content item is to be physically stored by the storage aggregator module, storage available to the storage aggregator module being provided by a plurality of client accounts accessible to the storage aggregator module over a network;
   determining that storage provided by a first client account at a first content storage provider to the storage aggregator module is insufficient to store the particular content item; and
   accessing a second client account at the first content storage provider or a second content storage provider to open a client account without user interaction-comprising a user request to obtain additional storage in response to determining that storage provided by the first client account is insufficient, wherein opening the client account comprises randomly generating a client name and password without the user interaction such the requester is not aware of the opening of the client account,
   wherein:
   the storage aggregator module is separate from the first content storage provider and the second content storage provider; and
   at least one of the first content storage provider and the second content storage provider is remotely located relative to the storage aggregator module and hosted by a web server.

2. A method as described in claim 1, wherein the executing further includes:
   dividing the particular content item into a plurality of portions;
   outputting at least one said portion for storage in the client account; and
   outputting another said portion for storage in another client account.

3. A method as described in claim 2, wherein the executing further includes:
   receiving a request for the particular content item from a requester;
   retrieving one or more said portions; configuring the one or more said portions to form the particular content item; and
   providing the particular content item to the requestor.

4. A method as described in claim 1, wherein:
   the particular content item is received by the module from a requester; and
   the requester is not aware of the client account.

5. A method as described in claim 1, wherein the executing of the module is performed by a web server that is configured to receive a plurality of requests from a plurality of clients that access the web server over the network.

6. A method as described in claim 1 wherein at least one said client account is compatible with a content type that is incompatible with another said client account.

7. A method as described in claim 1, further comprising reformatting, to an unrelated type, at least a portion of the particular content item for storage in the client account, wherein the reformatted portion of the particular content item is not compatible with an application that requested the module to store the particular content item.

8. A method comprising:
   receiving, at a storage aggregator, a content item from a requester for storage;
   dividing, via the storage aggregator, the content item into a plurality of portions;
   formatting, via the storage aggregator, a particular portion of the content item into a content format supported by a content storage provider, the particular portion of the content otherwise would not be compatible for storage on the content storage provider, wherein the content storage provider is where the particular portion of the content item is to be physically stored;
   outputting, by the storage aggregator, at least one of the plurality of portions for storage in a client account of the content storage provider opened without a user interaction comprising a user request and another at least one of the plurality of portions for storage in another client account of the same content storage provider or another content storage provider opened without the user interaction, wherein each said client account is accessible over a network.

9. A method as described in claim 8, further comprising reformatting the at least one of the plurality of portions for storage in the client account.

10. A method as described in claim 9, wherein the reformatted at least one portion is not compatible with the other client account.

11. A method as described in claim 9, wherein:
    the requestor includes an application that is configured to provide the content item; and
    the reformatted at least one portion is not compatible with the application.

12. A method as described in claim 8, wherein each said client account is accessible using a respective client name and a respective password.

13. A method as described in claim 8, wherein the requester is an application and the receiving, the dividing, and the outputting are performed through execution of a module.

14. A method as described in claim 8, wherein the client account is available from a content storage provider and the other client account is available from another content storage provider.

15. A method as described in claim 8, further comprising:
    determining whether there is sufficient storage available to store the content item; and
    opening the other client account to obtain additional storage when sufficient storage is not available.

16. One or more computer readable media storing computer executable instructions that configure a computing device to perform a method, the method comprising:
    aggregating storage available from a list of content storage providers over a network into a single content storage representation of a storage aggregator, the list of content storage provider being updated at periodic intervals, the plurality of content storage providers including an email provider, an online photo provider, and an online media storage provider, each content storage provider supporting one or more content formats for storage;
    presenting an interface to a user to request to store content via the single content storage representation without the user's direct interaction with the content storage providers;
    dividing the content into a plurality of portions;
    duplicating one or more of the portions of the content to provide redundancy;
    selecting a particular content storage provider from the list of content storage providers to store a particular portion of the content by utilizing a plurality of considerations including:
       amount of access time to the content storage providers;
       amount of storage space of the content storage providers;
       cost of storage space of the content storage providers;
       amount of processing time to store the portion of the content;
    obtaining a client account of the selected particular storage provider by generating a random client name and password of the client account;
    formatting the particular portion of the content into a content format supported by the particular content storage provider, the particular portion of the content otherwise would not be compatible for storage on the particular content storage provider;
    receiving a request for the content; and
    reformatting and combining the processed portions of the content from the content storage providers to form the requested content item.

17. One or more computer readable media as described in claim 16, wherein the content is further processed by one or more techniques selected from the group consisting of: compressing and encrypting.

18. One or more computer readable media as described in claim 16, wherein the content is processed such that the processed content is not readable by the at least one said content storage provider to understand data that is included in the content.

* * * * *

UNITED STATES PATENT AND TRADEMARK OFFICE
CERTIFICATE OF CORRECTION

| | | |
|---|---|---|
| PATENT NO. | : 7,720,935 B2 | |
| APPLICATION NO. | : 11/092154 | |
| DATED | : May 18, 2010 | |
| INVENTOR(S) | : Anoop Anantha | |

It is certified that error appears in the above-identified patent and that said Letters Patent is hereby corrected as shown below:

In column 10, line 52, in Claim 1, delete "interaction-" and insert -- interaction --, therefor.

In column 10, line 57, in Claim 1, after "such" insert -- that --.

Signed and Sealed this
Eighth Day of November, 2011

David J. Kappos
*Director of the United States Patent and Trademark Office*